Dec. 10, 1968 S. B. RONDUM 3,415,708
TABLE TOP
Filed Nov. 10, 1964

INVENTOR.
SVEND B. RONDUM
BY

ATTORNEY.

Patented Dec. 10, 1968

3,415,708
TABLE TOP
Svend B. Rondum, Bradford, Pa., assignor to Plexowood, Inc., Bradford, Pa., a corporation of Pennsylvania
Filed Nov. 10, 1964, Ser. No. 410,154
4 Claims. (Cl. 161—43)

ABSTRACT OF THE DISCLOSURE

A table top and method of making the same in the form of a composite body having top and bottom surfaces with a peripheral knife edge and a rounded surface on the top adjacent the knife edge, a layer of kraft paper impregnated with phenolic resin on both top and bottom surfaces and a sheet of wood veneer over the top surface and bonded thereto by the impregnated paper and forming therewith a sealed knife edge.

---

The present invention relates to table tops and is concerned primarily with a table top having a molded composite core and a veneer finish.

At the present time, it is known to produce a table top comprising a composite body having so called knife edges extending around the periphery thereof. Wood veneer is looked upon as a highly desirable finish but due to the grain thereof, it has been considered impractical if not impossible, to bend the veneer across the grain at the knife edges.

With the foregoing conditions in mind, the present invention has in view as an important object, the provision of a table top comprising a composite body having a knife edge about its periphery and a wood veneer finish which completely covers the top area defined by said knife edges.

When a composite body is molded to form the edges aforesaid there are curved surfaces immediately adjacent to the knife edges. The wood veneer must be bent or formed over these curved surfaces and this is true for the bending across the grain as well as with the grain. An object of the invention is to condition the wood veneer for this forming action.

In carrying out this objective, a layer of kraft paper impregnated with a phenolic resin is applied over the top surface and slightly beyond the knife edges. The wood veneer is applied over this kraft paper and the laminated structure is then subjected to heat and pressure. The impregnated kraft paper conditions the wood veener so that the latter may be shaped over the curved surfaces aforesaid and also acts as a bond for securing the veneer to the body.

A somewhat more detailed object of the invention is to provide a table top comprising a composite body having knife edges about its periphery, top and bottom layers of kraft paper impregnated with a phenolic resin, and a top layer of wood veneer that is formed over the top surface of the table.

In producing a table of the type noted, the top and bottom layers of impregnated kraft paper extends slightly beyond the knife edges. The wood veneer at the top also has a comparable extent so that when the laminated structure is subjected to heat and pressure, a flash is formed about the knife edges which is subsequently removed by trimming.

The invention therefore comprises a table top consisting of a composite body having knife edges about its periphery and curved surfaces immediately adjacent to said knife edges, top and bottom layers of kraft paper impregnated with a phenolic resin, and a top finish of wood veneer that is shaped to conform with said curved surfaces.

Figure 1:
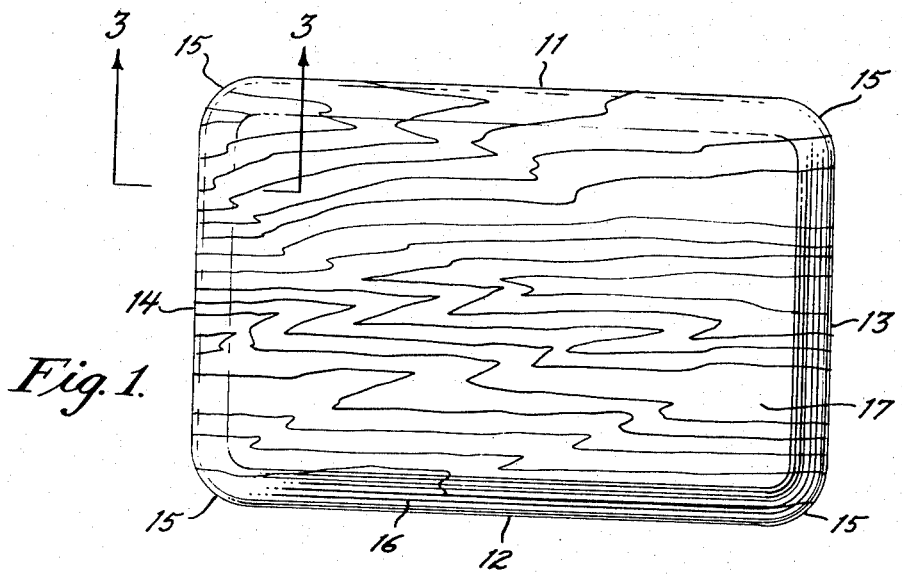
Figure 2:
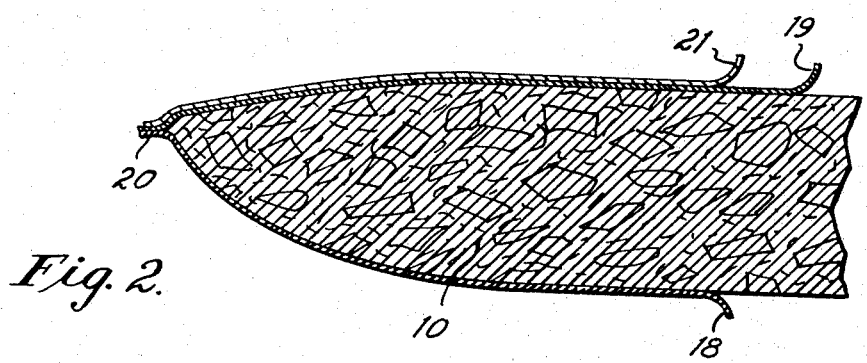
Figure 3:
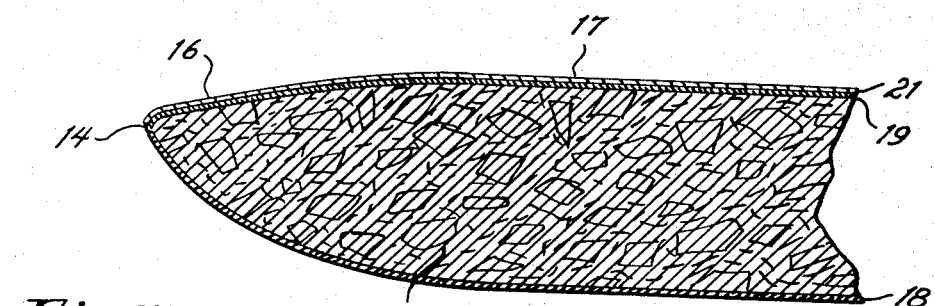

For a full and more complete understanding of the invention, reference may be had to the following description and accompanying drawing wherein:

FIGURE 1 is a top plan view of a table top made in accordance with the precepts of this invention, FIGURE 2 is a sectional view on an enlarged scale showing a portion of the composite body and the several layers peeled back, and FIGURE 3 is a detail section on an enlarged scale of a portion of a finished table top being taken about on the plane represented by the line 3—3 of FIGURE 1.

A composite body is shown at 10. While there are doubtlessly many materials which may be used to form a molded composite body the invention has particularly in mind the use of wood chips and resin which is readily susceptible to the molding operation under heat and pressure.

The body 10 will have the shape desired for the table top. A rectangular shape is indicated because it is conventional and such a shape presents side edges 11 and 12 and end edges 13 and 14. Where each side edge joins in with an end edge, there is a round corner 15. All of the edges 11, 12, 13, and 14 as well as the rounded corners 15 take the form of knife edges which are quite sharp. Immediately adjacent to the knife edges, there are rounded surfaces 16 which blend in with the flat top surface 17.

A bottom layer of kraft paper impregnated with a phenolic resin is shown at 18 and a similar layer of impregnated kraft paper shown at 19. These layers are applied to the bottom and top faces of the body 10 as shown in FIGURE 2 and extend out beyond the knife edges as indicated at 20.

A top finish of wood veneer is designated 21 and is applied over the top paper layer 19. It also extends slightly beyond the knife edges. The laminated structure comprising the body 10, paper layers 18 and 19, and wood veneer 21 are now subjected to heat and pressure which shapes and forms the wood veneer finish over the rounded surfaces 16. The top paper layer 19 which is impregnated with a phenolic resin conditions the wood veneer for the shaping operation even though the latter requires bending it across the grain at the rounded surface 16 at each end.

After the molding operation is completed, a flash will be formed as indicated at 20 in FIGURE 2. This flash is removed by trimming. The setting of the resin in the paper layer 19 serves to bond the wood veneer finish 21 to the body 10.

What is claimed is:

1. A table top comprising a composite body having top and bottom surfaces, a knife edge forming the outer periphery of the body and the joint between said top and bottom surfaces and a rounded surface immediately adjacent thereto and forming a part of the top surface, a layer of kraft paper impregnated with a phenolic resin covering both top and bottom surfaces of said body and extending over said rounded surface and sealingly joined at said knife edge and a wood veneer sheet having a grain with said veneer sheet being formed over said rounded surface across the grain and bonded to said body by said impregnated paper and forming therewith the outer knife edge.

2. A table top of rectangular formation having top and bottom surfaces, side and end knife edges forming the outer periphery of the body and the joint between said top and bottom surfaces, said top surface being flat, curved surfaces extending from said flat top surface to said knife edges, said top comprising a composite body, a layer of kraft paper impregnated with a phenolic resin extending over both the bottom and top flat surface, and said curved surface and sealingly joined at said knife edge, and a wood veneer sheet having a grain and applied to said top surfaces conforming in shape thereto and bonded to the body by said impregnated paper and forming therewith the outer knife edge.

3. A table top of rectangular shape defined by side and end edges and rounded corners with all of said edges and corners being knife edges and rounded surfaces immediately adjacent to said knife edges, said top comprising a composite body of molded wood chips and resin, top and bottom layers of kraft paper impregnated with a phenolic resin sealingly joined at said knife edge and a wood veneer sheet over said top layer of impregnated paper, said wood veneer finish having a grain and formed over the rounded surfaces adjacent to said end edges across said grain, said wood veneer finish being bonded to the body by said impregnated paper and forming therewith the outer knife edge.

4. In the manufacture of a table top, the method comprises the steps of: (a) molding a composite body having knife edges about its periphery and rounded surfaces immediately adjacent to said knife edges, (b) applying layers of kraft paper impregnated with a phenolic resin to the top and bottom surfaces of said body with said paper extending beyond said knife edges, (c) applying a wood veneer sheet having a grain over the top layer of impregnated paper and extending beyond said knife edges, (d) subjecting the assembled core, paper layers, and veneer sheet to heat and pressure to form said veneer sheet over said rounded surfaces and bond it to said body and to said impregnated paper and to sealingly cover the knife edge, and (e) trimming the flash that is formed by the paper and veneer sheets extending beyond said knife edges.

References Cited
UNITED STATES PATENTS

| | | | |
|---|---|---|---|
| 1,891,430 | 12/1932 | Loetscher | 156—335 X |
| 3,055,783 | 9/1962 | Hendrickson et al. | 161—43 |
| 3,234,064 | 2/1966 | Smith | 156—222 |
| 3,283,052 | 11/1966 | Munk | 264—248 |
| 3,298,894 | 1/1967 | Barnette | 161—43 |

ROBERT F. BURNETT, *Primary Examiner.*

W. A. POWELL, *Assistant Examiner.*

U.S. Cl. X.R.

161—44, 118, 120, 124, 149, 164; 156—213, 267, 297, 242; 52—309, 313, 613